April 30, 1940.  E. B. DEWEY  2,199,305
NEGATIVE HOLDER FOR PHOTOGRAPHIC PRINTERS, ENLARGERS, OR THE LIKE
Original Filed May 23, 1939
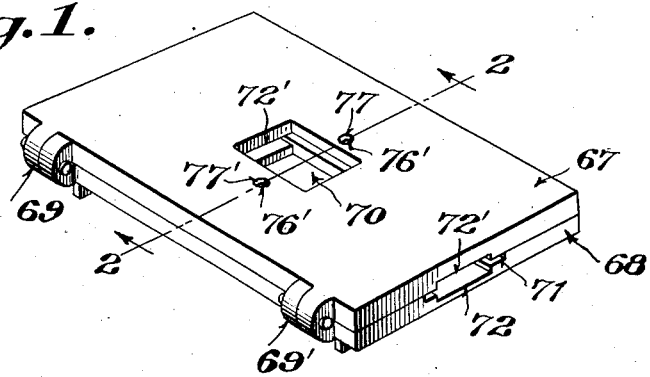
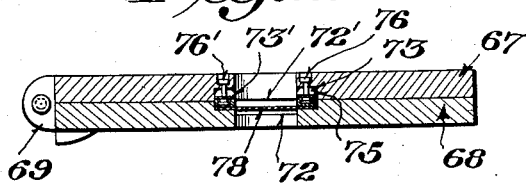
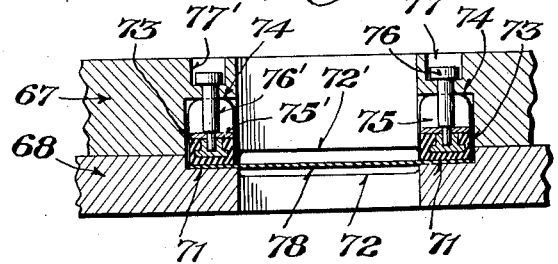
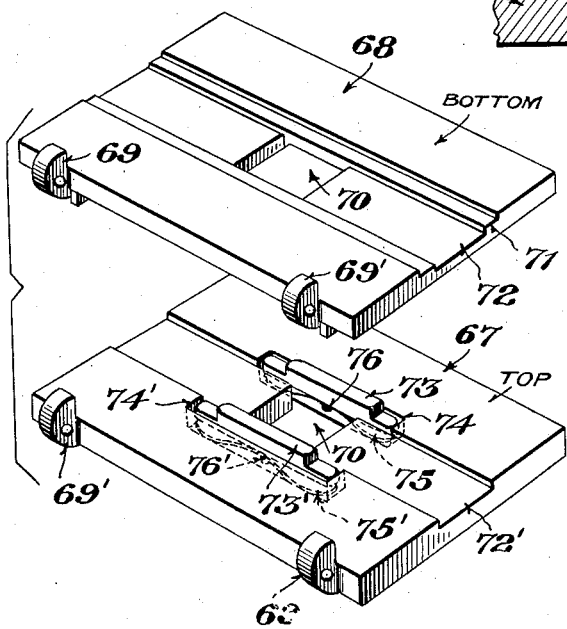
Inventor
Edward Bradley Dewey Patented Apr. 30, 1940

2,199,305

UNITED STATES PATENT OFFICE 2,199,305

NEGATIVE HOLDER FOR PHOTOGRAPHIC PRINTERS, ENLARGERS, OR THE LIKE

Edward Bradley Dewey, Washington, D. C.

Original application May 23, 1939, Serial No. 275,290. Divided and this application September 13, 1939, Serial No. 294,739

9 Claims. (Cl. 88—24)

This invention is a novel improvment in negative holders for photographic printers, enlargers, or the like, the present application being a division of my copending application Serial No. 275,290, filed May 23, 1939 which has issued as Patent No. 2,194,384 of Mar. 19, 1940.

The principal object of my present invention is to provide a negative holder of the above type consisting of two superimposed flat members made of any suitable material, preferably of Bakelite or other opaque plastic material, hinged along one edge so as to open like a book, said superimposed members having registering openings in their centers to allow light to pass through the negative held between said members, opposed slots being formed in the adjacent faces of the members of substantially the same width as the opening, said slots preferably being parallel with the hinge, and one member having recesses at each side of the slot communicating with the slot adapted to receive the side edges of a negative so that no part of the negative holder will come into contact with printable portion of the adjacent surface of the negative; and similar recesses being provided in the other member of the negative holder to eliminate any chance of marring the picture surface of the negative, said recesses in the other member housing strips disposed parallel with the recesses and making contact with the marginal portion of the negative supported on the shoulders formed by the recesses in the first member of the negative holder, said strips being yieldably pressed towards the negative so as to grip the edge portion of the negative and hold it firmly in the holder; and said yieldable means taking care of any difference in thickness in the different negatives used.

Other minor objects of my invention will appear from the following description.

I will explain the invention with reference to the accompanying drawing which illustrates one practical embodiment thereof to enable others familiar with the art to adopt and use the same; and will summarize in the claims, the novel features of construction, and novel combinations of parts, for which protection is desired.

In said drawing:

Fig. 1 is a perspective view of the negative holder in closed position.

Fig. 2 is a cross-sectional view drawn on the line 2—2 of Fig. 1, looking in the direction of the arrows.

Fig. 3 is an enlarged detail sectional view of Fig. 2, showing the light window and associated parts.

Fig. 4 is a detail expanded perspective view of Fig. 1, showing the bottom and top inverted.

As shown in the drawing, the negative holder preferably comprises a pair of superimposed plate members 67 and 68 formed of any suitable material, but preferably Bakelite or other opaque plastic material, said members being hinged together along one edge as at 69 and 69' so as to open as a book. In each member 67—68 is an opening 70 adapted to register when the said members are superimposed, the opening being adapated to permit passage of light rays through the holder.

In the adjacent faces of the superimposed members 67—68 are opposed slots 72—72' extending across the openings 70, the registering slots being preferably disposed parallel with the hinge of the holder, and the slots 72—72' preferably extending from end to end of the plates. Slots 72—72' are substantially equal in width to that of the openings 70.

In the face of one member 68 at each side of the slot 72 are recesses 71 communicating with the slot 72, said recesses 71 forming shoulders adapted to receive the opposite edges of a negative 78 (Fig. 3) held in the holder. In the other member 67 of the holder are recesses 74—74' communicating with the slot 72' and extending beyond the ends of the opening 70, slots 74—74' being relatively deep.

Within the recesses 74—74' are strips 73—73' extending substantially the full length thereof, said strips being reciprocably retained in said recesses by means of bolts 76—76' having heads seated in bores 77—77' in the member 67, whereby the strips 73—73' may be moved towards or from the member 78, but are prevented by the bolts from rotating in the recesses or from being removed therefrom. Preferably bolts 76—76' are at the centers of the strips.

The strips 73—73' are preferably formed of material similar to that of the members 67—68 of the holder, and are yieldably urged outwardly of the recesses by means of bow springs 75—75' or the like which are interposed between the bases of the recesses and the inner faces of the strips, and are preferably transfixed by the pins 76—76'.

In operation the members 67—68 of the holder are swung open, and a strip of negative 78 is placed on the shoulders formed by recesses 71 in the member 68, with the desired exposure on the negative disposed opposite the opening 70 therein, the side edges of negative 78 resting upon the said shoulders. The members 67—68 are then swung closed, and the closing of said members will cause the strips 73—73' to yieldably press the edges of the negative 78 down upon the shoulders 71 in way of the opening 70, and securely maintain the negative in printing position in the holder, no portion of the sensitive surface of the negative contacting with the holder or its parts, and thus the above construction preserves the picture portion of the negative from injury.

I do not limit my invention to the exact form shown in the drawing, for obviously changes may be made therein within the scope of the claims.

I claim:

1. A negative holder for photographic printers, enlargers or the like comprising a pair of superimposed flat members having registering openings for passage of light rays therethrough; said members having opposed slots in their adjacent faces disposed across the openings in the members, said slots being of substantially the same width as the openings; one member having recesses at both sides of the slot communicating with the slots, and yieldable strips mounted in the recesses adapted to engage the edges of a negative seated across the openings, said strips being of less depth than the recesses in said member; means for preventing removal of the strips from the recesses; and springs interposed between the bottoms of the recesses and the backs of the strips.

2. A negative holder for photographic printers, enlargers or the like comprising a pair of superimposed flat members having registering openings for passage of light rays therethrough; said members having opposed slots in their adjacent faces disposed across the openings in the members, said slots being of substantially the same width as the openings; and said members having recesses in their adjacent faces at each side of the slots communicating with the slots, said recesses in one member forming shoulders adapted to support opposite edges of the negative, and yieldable strips mounted in the recesses in the other member adapted to maintain the edges of the negative seated on the shoulders of the first member, said strips being of less depth than the recesses in said member; means for preventing removal of the strips from the recesses; and springs interposed between the bottoms of the recesses and the backs of the strips.

3. A negative holder for photographic printers, enlargers or the like comprising a pair of superimposed flat members having registering openings for passage of light rays therethrough; said members having opposed slots in their adjacent faces disposed across the openings in the members, said slots being of substantially the same width as the openings; and said members having recesses in their adjacent faces at each side of the slots communicating with the slots, said recesses in one member forming shoulders adapted to support opposite edges of the negative, and yieldable strips mounted in the recesses in the other member adapted to maintain the edges of the negative seated on the shoulders of the first member, said strips being coextensive with the length of the openings in the member, and being of less depth than the recesses in said member; means for preventing removal of the strips from the recesses; and springs interposed between the bottoms of the recesses and the backs of the strips.

4. A negative holder for photographic printers, enlargers or the like comprising a pair of superimposed flat members hingedly connected together along one edge, and having registering openings for passage of light rays therethrough; said members having opposed slots in their adjacent faces extending parallel with the hinge connection and, disposed across the openings in the members, said slots being of substantially same width as the openings; and said members having recesses in their adjacent faces at each side of the slots communicating with the slots, said recesses in one member forming shoulders adapted to support opposite edges of the negative, and yieldable strips mounted in the recesses in the other member adapted to maintain the edges of the negative seated on the shoulders of the first member, said strips being of less depth than the recesses in said member; means for preventing removal of the strips from the recesses; and springs interposed between the bottoms of the recesses and the backs of the strips.

5. A negative holder for photographic printers, enlargers or the like comprising a pair of superimposed flat members hingedly connected together along one edge, and having registering openings for passage of light rays therethrough; said members having opposed slots in their adjacent faces extending parallel with the hinge connection and disposed across the openings in the members, said slots being of substantially same width as the openings; and said members having recesses in their adjacent faces at each side of the slots communicating with the slots, said recesses in one member forming shoulders adapted to support opposite edges of the negative, and yieldable strips mounted in the recesses in the other member adapted to maintain the edges of the negative seated on the shoulders of the first member, said strips being coextensive with the length of the openings in the member, and being of less depth than the recesses in said member; means for preventing removal of the strips from the recesses; and springs interposed between the bottoms of the recesses and the backs of the strips.

6. A negative holder for photographic printers, enlargers, or the like, comprising a pair of superimposed members having registering openings for passage of light rays therethrough; one of said members having a slot in its contacting face disposed across the opening and of substantially the same width as said opening; said slot having recesses in each side; movable strips in the recesses of less depth than said recesses and adapted to engage the edges of a negative seated across the openings; means for preventing removal of the strips from the recesses; and yieldable means interposed between the bottoms of the recesses and the backs of the strips.

7. A negative holder for photographic printers, enlargers, or the like, comprising a pair of superimposed members having registering openings for passage of light rays therethrough; one of said members having a slot in its contacting face disposed across the opening and of substantially the same width as said opening; said slot having recesses in each side; movable strips in the recesses of less depth than said recesses adapted to engage the edges of a negative seated across the openings; said strips being coextensive with the length of the opening in the member; means for preventing removal of the strips from the recesses; and yieldable means interposed between the bottoms of the recesses and the backs of the strips.

8. A negative holder for photographic printers, enlargers, or the like, comprising a pair of superimposed members having registering openings for passage of light rays therethrough, and having opposed slots in their adjacent faces disposed across the openings and of substantially same width as said openings; said slots each having recesses in each side, the recesses in one slot forming shoulders adapted to support the opposite edges of a negative; movable strips of less depth than the recesses mounted in the recesses of the other slot and adapted to maintain the edges of the negative seated on the shoulders of the first slot; means for retaining the strips in the recesses; and yieldable means interposed between the bottoms of the related recesses and the backs of the strips.

9. A negative holder for photographic printers, enlargers, or the like, comprising a pair of superimposed members having registering openings for passage of light rays therethrough, and having opposed slots in their adjacent faces disposed across the openings and of substantially same width as said openings; said slots each having recesses in each side, the recesses in one slot forming shoulders adapted to support the opposite edges of a negative; movable strips of less depth than the recesses mounted in the recesses of the other slot and adapted to maintain the edges of the negative seated on the shoulders of the first slot; said strips being coextensive with the length of the openings in the member; means for retaining the strips in the recesses; and yieldable means interposed between the bottoms of the related recesses and the backs of the strips.

EDWARD BRADLEY DEWEY.